(No Model.) 5 Sheets—Sheet 2.
L. BOUDREAU.
DEVICE FOR CONVEYING COAL.
No. 415,493. Patented Nov. 19, 1889.
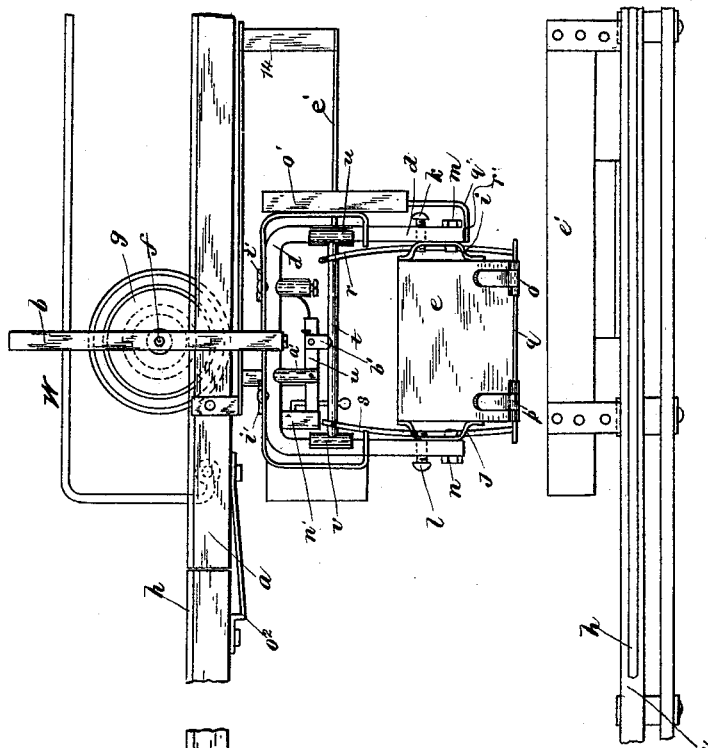
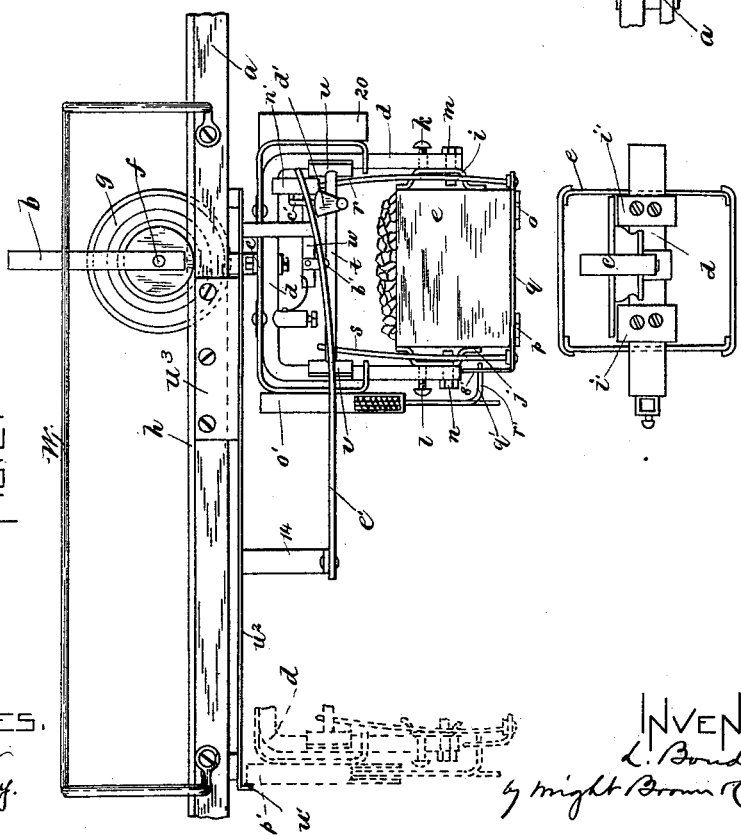
Witnesses:
H. Brown
W. C. Ramsay
Inventor:
L. Boudreau
by Wright Brown Crossley
Attys

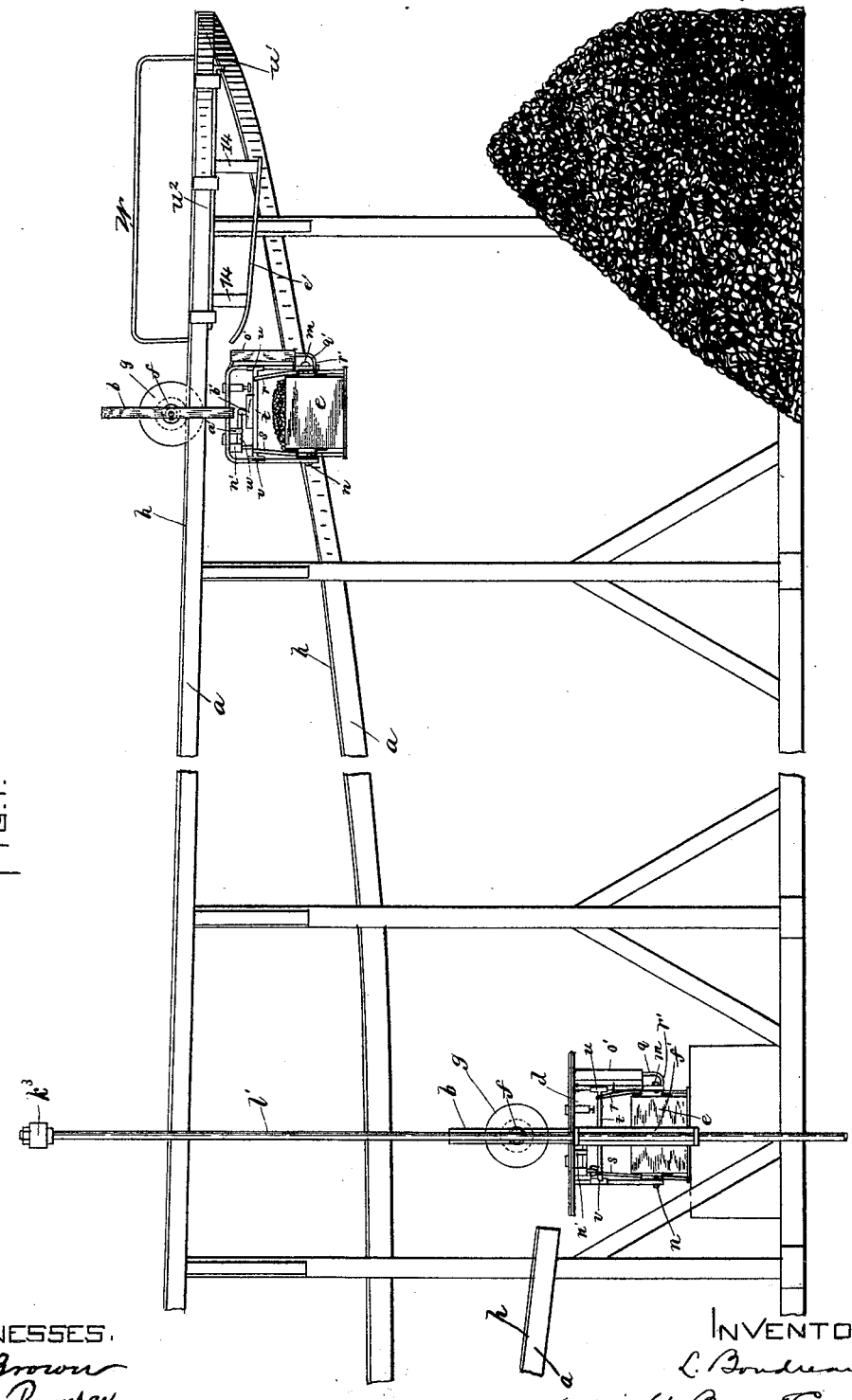

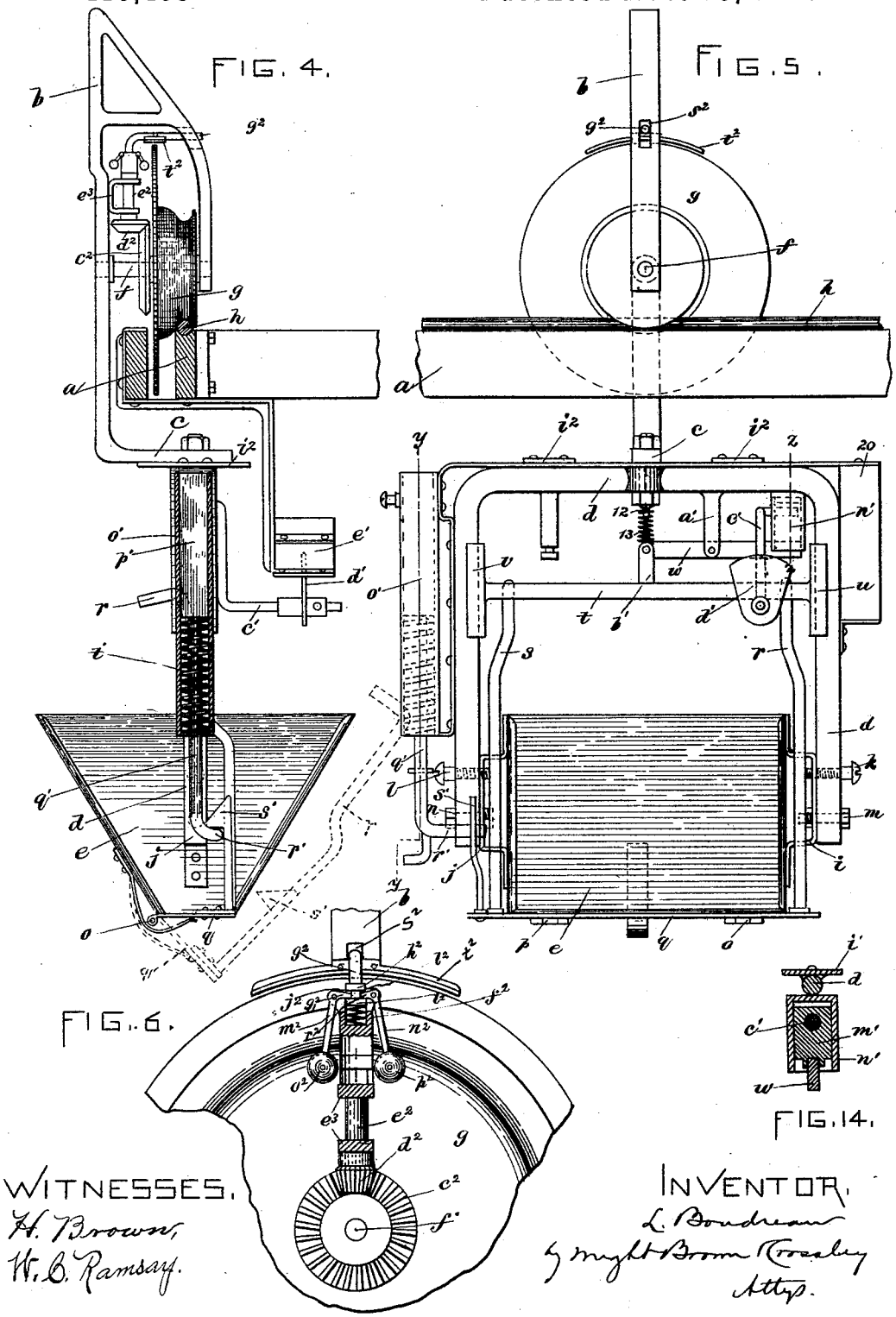

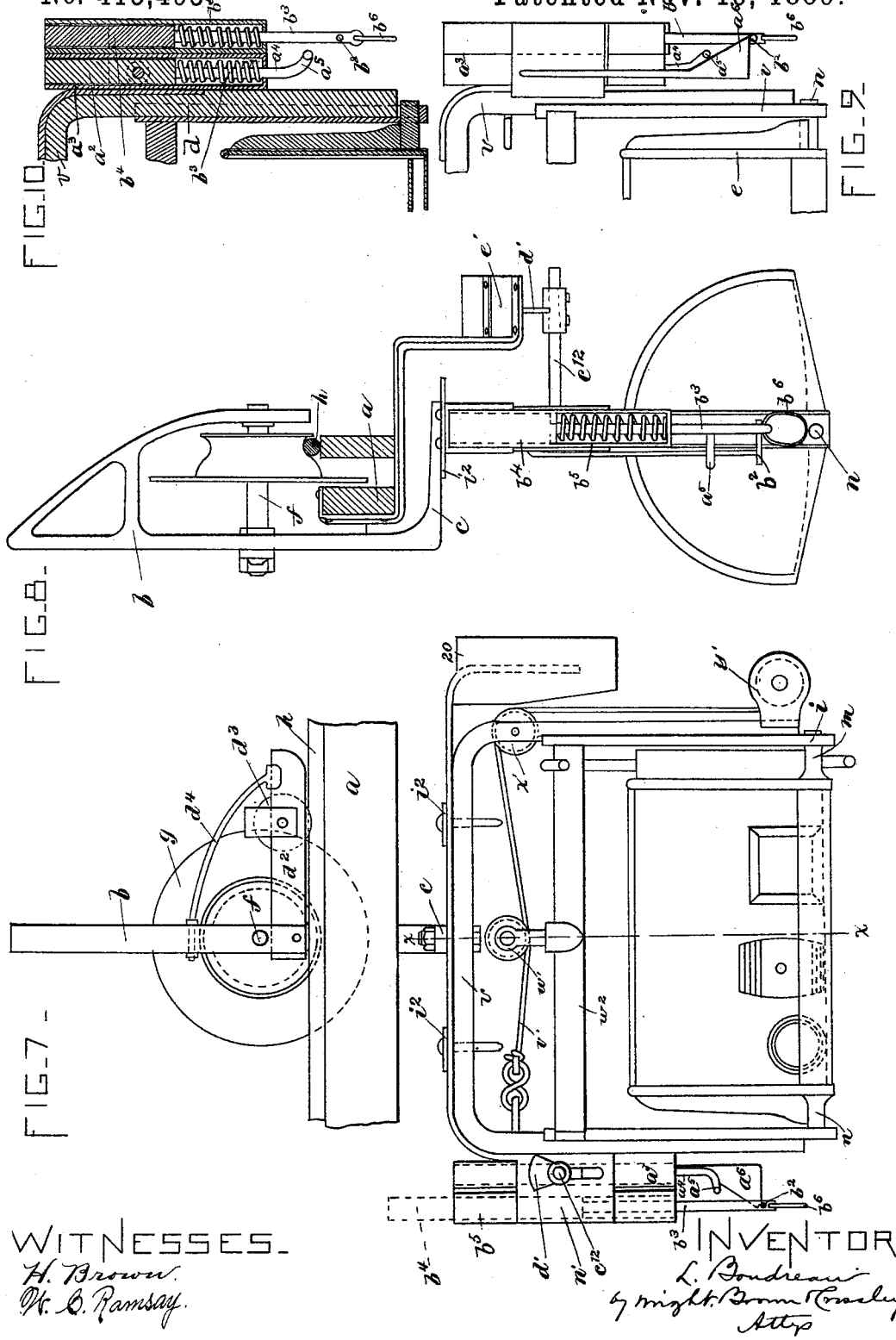

(No Model.) 5 Sheets—Sheet 5.
L. BOUDREAU.
DEVICE FOR CONVEYING COAL.
No. 415,493. Patented Nov. 19, 1889.
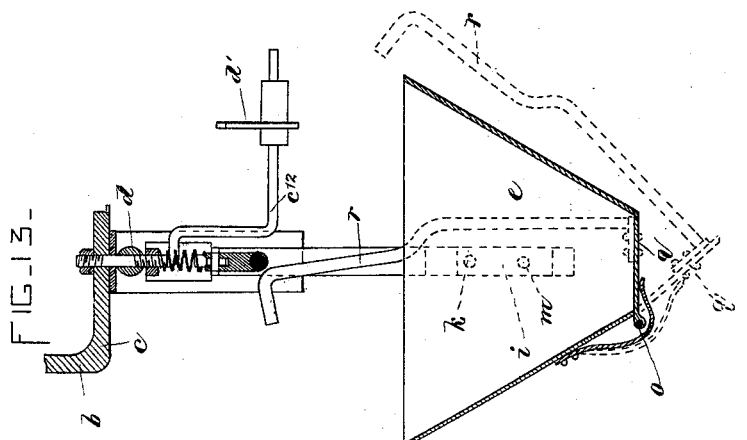
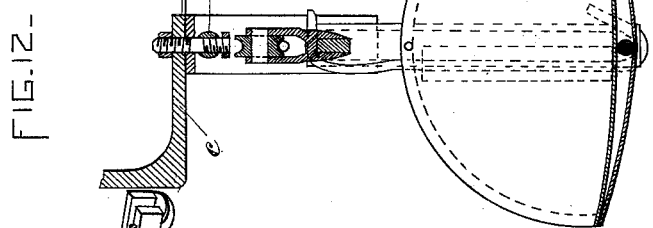
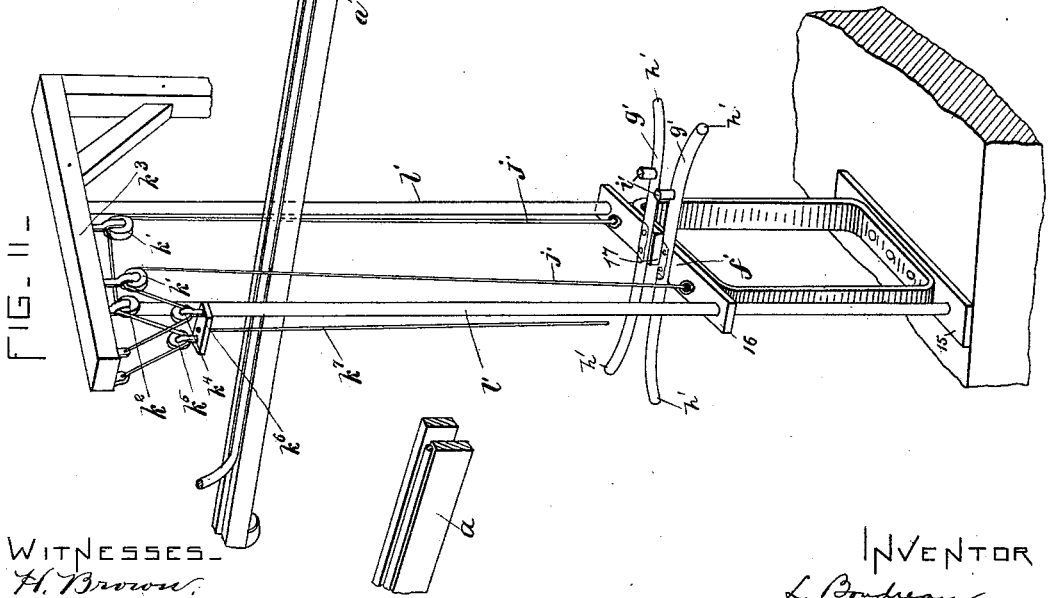
WITNESSES
H. Brown
W. C. Ramsay
INVENTOR
L. Boudreau
by Wright Brown Crossley
Attys.

UNITED STATES PATENT OFFICE.

LÉANDRE BOUDREAU, OF MANCHESTER, NEW HAMPSHIRE.

DEVICE FOR CONVEYING COAL.

SPECIFICATION forming part of Letters Patent No. 415,493, dated November 19, 1889.

Application filed August 30, 1888. Serial No. 284,113. (No model.)

*To all whom it may concern:*

Be it known that I, LÉANDRE BOUDREAU, of Manchester, in the county of Hillsborough and State of New Hampshire, have invented certain new and useful Improvements in Devices for Conveying Coal, &c., of which the following is a specification.

This invention relates to devices for conveying coal, wood, hay, or other articles from one point or place on a dock or in a warehouse, or other place where such articles are handled, and depositing the same on cars or in bulk at any point or place for storage, shipment, or transfer by a system of conveyers arranged to be run on elevated tracks, whereby said articles may be carried to and be deposited at any desired point covered by said system of tracks and the conveyer be returned to the point from which it was started.

The invention has for its object to provide a conveyer which shall be substantially automatic in its operation, whereby the above-named articles may be handled with convenience and the minimum of expense.

To these ends the invention consists in the improvements which I will now proceed to describe.

Of the accompanying drawings, forming a part of this specification, Figure 1 represents a side elevation of a track, partly broken away, and conveyer embodying my improvements, the conveyer being shown as loaded with coal. Figs. 2 and 3 represent front and rear views of the conveyer with portions of the track upon which it is adapted to be run. Figs. 4 and 5 represent enlarged front and rear views of the conveyers and track, Fig. 4 being taken on the sectional line $y\,y$, Fig. 5. Fig. 6 represents a detail view of devices hereinafter explained. Fig. 7 represents a modified form of conveyer for transporting articles in packages, barrels, boxes, &c. Fig. 8 represents an end view of the same. Fig. 9 represents a detail hereinafter described. Fig. 10 represents a vertical sectional view of the same. Fig. 11 represents a perspective detail view hereinafter referred to. Fig. 12 represents a section on line $x\,x$, Fig. 7. Fig. 13 represents a section on line $y\,y$, Fig. 5. Figs. 14, 15, and 16 represent detail views.

The same letters of reference indicate the same parts in all of the views.

In carrying out my invention I provide a track $a$, substantially the same as that shown and described in Letters Patent of the United States No. 303,800, granted to me August 19, 1884, to which reference may be had.

I will now proceed to describe the conveyer and its operative devices, showing the arrangement and functions of said devices.

$b$ represents a yoke or hanger extending downwardly on the rear side of the track and provided with an arm or offset $c$, extending under the track, to which arm is secured the supporting-frame $d$ of a bucket or tub $e$, adapted to receive the coal, &c., to be moved. A shaft $f$ is journaled in bearings in said yoke and has a wheel $g$ thereon. Said wheel rests on the rail $h$ of track $a$, and is adapted to roll thereon in the manner described in the before-mentioned patent. The rail $h$ is preferably of round iron secured to the wooden portion of the track in any suitable manner. (See Figs. 4 and 5.) The track is shown as composed of two parallel portions or sections. This is the preferred form of construction, since it serves to prevent the wheel $g$ from having a too great lateral movement.

The frame $d$ of the conveyer extends downwardly on each end of bucket $e$, which bucket is provided with brackets $i\,j$, riveted thereto, and is held rigidly to the frame by bolts or screws $k\,l$, Fig. 5, and is supported by journal-bolts $m\,n$, upon which the bucket can turn or swing by removing said bolts $k\,l$. The bottom $q$ of the bucket is provided with hinges $o\,p$ at one side of the same, and is adapted to swing downwardly on the same when necessary to discharge the contents; or the bucket may be tipped bodily on the journals $m\,n$, as will be readily understood by reference to Figs. 4 and 5, by simply removing bolts $k\,l$, as above stated. Extending upwardly from the hinged or pivoted bottom $q$ are two arms $r\,s$. Said arms are rigidly secured to the bottom $q$ at their lower ends, and their upper ends engage with a cross-bar $t$, provided with guides $u\,v$ at each end, adapted to engage with frame $d$ in such manner as that cross-bar $t$ may be moved up and down by a lever $w$, pivoted to a fulcrum-arm $a'$ and connected at its inner end to a short arm or stud $b'$ of said cross-bar. To this arm or stud $b'$ and to the lower end of a central bolt 12 of frame $d$ are connected the ends of a coil-spring 13, which prevents too great a jar when the parts are operated.

$c'$ is a bent or angular arm secured at its inner end to a block $m'$, (a section of which on line $z\ z$, Fig. 5, is shown in Fig. 14,) adapted to move longitudinally in a sleeve $n'$, secured to the conveyer-frame, the lower end of said block resting upon the outer end of lever $w$. This angular arm $c'$ is bent outwardly from lever $w$ at its outer end and has adjustably secured thereon a fan-shaped plate or arm $d'$, having an upper rounded edge, which is designed to engage a shoe $e'$ secured to the track at any point at which it may be desired to stop the conveyer by means of hanger-arms 14. Plate $d'$ is so arranged on arm $c'$ as that the plate may be moved outwardly or inwardly, so as to pass beyond shoe $e'$ without engaging with the latter. For instance, in discharging coal from a vessel to a wharf, should it be necessary to deposit the coal beyond where a previous cargo had been deposited, or in case of different variety of coal, the plate $d'$ may be moved on arm $c'$, so as to avoid coming in contact with any shoe between the starting-point and the place where it is desired to deposit the coal, which arrangement is of great convenience to those handling different varieties of coal, &c.

In order that the conveyer may move freely, I prefer to construct the track $a$ on a sufficient incline to enable said conveyer to move by gravitation from starting-point to returning-point, as shown in Fig. 1.

I have shown in Fig. 11 a detail view of the manner in which the conveyer may be raised to the track after it has been discharged and has returned to the starting-point, in which $f'$ represents a frame adapted to receive the conveyer from the track $a$. This frame $f'$ is preferably square or oblong, and to its upper and lower portions are connected transverse bars 15 16, designed to slide up and down on vertical rods $l'\ l'$, secured at their lower ends to the ground or a base or platform. The bar 16 is constructed in two parts, or has a central opening 17, coinciding or registering with a similar opening in the upper bar of frame $f'$. These openings are provided to receive the conveyer-frame, the lower portion of which will be located within frame $f'$. To said frame or to the upper bar 16 are secured two rails $g'\ g'$, arranged with spreading ends $h'\ h'$ to receive the conveyer-frame therebetween. Two stops $i'\ i'$ are secured to said rails, with which engage stops $i^2\ i^2$ on said conveyer-frame, the arrangement being such as to prevent the conveyer from running too far onto the frame when passing to the latter from track $a$. These stops $i^2$ rest upon rails $g'\ g'$ when the conveyer-frame is slid thereon, said stops being made preferably of flat plates, the projecting ends of which bear on said rails, as stated. To the frame $f'$ are attached two ropes or chains $j'\ j'$, adapted to pass over pulleys $k'\ k'\ k^2$, attached to a beam $k^3$, being a part of frame L, a portion of said frame being shown in Fig. 11, and thence under pulleys $k^4\ k^5$, attached to a plate $k^6$, having a rope $k^7$ secured thereto, which rope is adapted to pass around a drum or windlass. (Not shown.)

In the operation of my improved conveyer let it be supposed that the same has been loaded and raised to the track, or has been raised to the track to be loaded, which will preferably be done by the means shown in Fig. 11, and started on the track, as shown in Figs. 1 and 2. It will be seen that plate $d'$ is just engaging with the under side of shoe $e'$, and will be carried along the same by the conveyer to which it is connected. This movement depresses lever $w$ through arm $c'$, causing cross-bar $t$ to be raised by lever $w$ until arms $r\ s$ (holding the hinged bottom $q$ of bucket $e$ in place) are released, allowing the same to open (see dotted lines in Fig. 4) and the contents to be discharged. Secured to the conveyer-frame at one end is a casing $o'$. (Shown in section in Fig. 4, seen most clearly in Fig. 5.) Said casing is preferably square in cross-section and contains a bolt $p'$, secured to a rod $q'$ extending downwardly through the casing and having an arm $r'$, adapted to engage with a detent $s'$, secured to the hinged bottom of the bucket $e$. As the conveyer in moving along the track reaches the shoe $e'$ the fan-shaped plate $d'$ engages with it, and in releasing the arms $r\ s$, as before described, the dropping of lid $q$ carries detent $s'$ out of engagement with arm $r'$, allowing bolt $p'$ to be forced upwardly in casing $o'$ by spring $t'$ a sufficient distance to permit said bolt to come in contact with a stop $u'$ on one end of a plate $u^2$, as shown in dotted lines in Fig. 2, thus preventing the conveyer from going beyond the discharging-point. This plate $u^2$ extends parallel with the track and has a right-angular portion $u^3$ secured to said track. The stop $u'$ is a short distance beyond the shoe $e'$. The conveyer having discharged its contents, an attendant readjusts the devices just described, and it is then adapted to proceed to the starting-point to be again loaded.

I do not limit myself to the employment of the swinging or hinged lid to effect the discharge of the bucket, as I have provided means for keeping said lid closed, and by removing screws $k\ l$ from brackets $i\ j$ the bucket can be operated bodily to discharge its contents, rotating sufficiently on pivot-bolts $m\ n$ to discharge its contents from its normally upper open end, as will be readily seen.

I have shown in Fig. 7 a different form of conveyer adapted to carry barrels, boxes, &c., in which $v'$ represents a rope or chain secured at one end to the conveyer-frame and passing under a pulley $w'$, attached to the cross-bar $w^2$, over a pulley $x'$, journaled in bearings in the frame, and downwardly around a drum or pulley $y'$, providing means for raising and lowering the conveyer to and from the surface for the discharge of such articles as cannot be dumped. This form of conveyer is provided with a releasing device, in which the arm $c^{12}$ is connected at its inner end with a bolt $a^2$ in a casing $a^3$, attached to the frame $v$ of the conveyer. To the lower end of said bolt $a^2$ is attached a rod $a^4$, extending downwardly and bent at right angles to form an arm $a^5$, said arm extending over an inclined or wedge-shaped abutment $a^6$, depending from or loosely secured to casing $a^3$, so as to have a slight inward movement. With the lower outer edge of this abutment is designed to engage a pin $b^2$ of a rod $b^3$, extended from a spring-pressed bolt $b^4$, inclosed in a casing $b^5$, secured to casing $a^3$. This abutment serves to hold said bolt $b^4$ depressed in its casing. To the lower end of rod $b^3$ is secured a loop $b^6$, by which the operator can pull down on the spring-pressed bolt $b^4$. When the conveyer moves along the track, so as to bring the plate on arm $c^{12}$ into engagement with shoe $e'$, as hereinbefore described, the bolt $a^2$ is depressed through arm $c^{12}$. This movement causes abutment $a^6$ to be disengaged from pin $b^2$ by the pressing inward of said abutment by arm $a^5$ engaging the angular or inclined edge of the same and forcing the arm out of engagement with pin $b^2$, thus permitting bolt $b^4$ to be forced upwardly by spring $b^5$ in the manner hereinbefore described.

I do not limit myself to the devices herein shown and described for conveying coal, merchandise, &c., as I can apply the same principle to different forms for handling different articles—such as hay in bales or in bulk, or wood, bark, &c.—without departing from the nature or spirit of my invention.

It being necessary, as before stated, to have the track on a sufficient incline to permit the conveyer to run on the same by gravitation, it would, as a matter of course, when traveling a long distance attain too great a rate of speed. To prevent this I have provided a brake the operative parts of which are arranged on the principle of an engine-governor, which I will next describe.

In Fig. 6 I have shown a portion of wheel $g$ and yoke $b$. To the journal on which said wheel rotates and adapted to rotate therewith is attached a bevel-gear $c^2$, meshing with another bevel-gear $d^2$, attached to the lower end of a vertical shaft $e^2$, secured to yoke $b$ by a U-shaped plate $e^3$, through the lateral arms of which it is passed, Fig. 4. Said shaft has in its upper end a socket $f^2$, adapted to receive an arm or bar $g^2$, having collars $h^2$ $i^2$ thereon at its inner end, its outer end being loosely secured in a slot $s^2$ in yoke $b$, as shown in Fig. 4. Pivoted to ears $j^2$ $l^2$ on the upper end of shaft $e^2$ are two arms $m^2 n^2$, having weights $o^2$ $p^2$ attached to their lower ends, and having short arms $q^2$ $r^2$ on their upper ends, adapted to project between the collars $h^2$ $i^2$ on arm or bar $g^2$. Said arm or bar $g^2$ extends upwardly and is bent at right angles and passes over wheel $g$, after which it is secured in slot $s^2$ in yoke $b$. To said arm or bar is attached a "shoe" $t^2$, adapted to engage with the periphery of wheel $g$ (through the devices just described) to check the speed of the latter when necessary. It will be seen by reference to Fig. 6 that when wheel $g$ rotates it communicates motion to shaft $e^2$ through gears $c^2$ $d^2$, carrying around the arms $m^2$ $n^2$, with their attached weights, causing the latter to describe a radius in proportion to the rapidity of their revolutions, which causes arms $m^2$ $n^2$ to engage collar $i^2$, depressing arm or bar $g^2$ and its attached shoe until the latter comes in contact with the periphery of wheel $g$, as will be readily understood by reference to Figs. 4, 5, and 6.

In order to prevent the swaying motion to which the conveyer would be subjected by being stopped too suddenly, I have provided an arm $d^2$, Fig. 7, pivoted at its inner end to yoke $b$, and having suitably secured at its outer end a wheel $d^3$, adapted to run on the rail $h$, and an arm $d^4$, secured at one end to the yoke and detachably connected at the other end with arm $d^2$ by overlapping and bearing on the upper edge thereof, so as to permit the yoke to have a slight rising movement. I am also enabled by the employment of the wheel $d^3$ to use much sharper curves in the construction of my track, as said wheel acts as a leader or guide for wheel $g$ and reduces the friction on the same when rounding a sharp curve.

In several of the figures of the drawings I have shown a bar or rail W, secured to the main track on the side opposite to the shoe $e'$. The object thereof is to prevent the wheel $g$ from jumping the track by too great lateral movement of the yoke or bucket when the operating-arm comes in contact with said shoe.

In passing from the main track to a branch, as is often necessary, the flange of wheel $g$ is raised so as to be clear of rail $h$, as described in the before-mentioned patent, and when running fast the conveyer is liable to be raised too high and does not take the branch properly. To prevent this, I have provided a safeguard, which consists of an inclined plate $o^2$, (see Fig. 3,) secured to the under side of the track in such position as that the conveyer may, when raised sufficiently to pass from the main track to a branch, come in contact with said plate, thus obviating the before-mentioned difficulty by reason of said plate $a^2$ arresting the upward movement of the conveyer before the wheel can entirely clear the track.

I have shown a weight 20 secured to one side of the conveyer-frame to properly counterbalance the added or increased weight of the other side.

Having thus described my invention, what I claim is—

1. In an elevated carrier, the combination, with a rail or track having periodically-arranged projecting portions or shoes, of a yoke or hanger having a wheel resting on said rail or track, a frame secured to the lower end of said yoke or hanger, the bucket secured in said frame and provided with a hinged bottom, the upwardly-projecting arms $r\ s$, secured to said bottom and engaging a movable portion of said frame, and the bent or angular arm $c'$, designed to engage said shoe and to operate said movable portion of the frame, substantially as set forth.

2. In an elevated carrier, the combination, with the rail or track having periodically-arranged projecting portions or shoes, of a yoke or hanger having a wheel resting on said rail or track, a frame secured to the lower end of said yoke or hanger, the bucket secured in said frame and provided with a hinged bottom, the upwardly-projecting arms $r\ s$, secured to said bottom, the movable bar $t$ of said frame, the lever $w$, connected to said bar, the bent or angular arm $c'$, and the block $m'$, secured thereto and bearing on one end of said lever, substantially as set forth.

3. In an elevated carrier, the combination, with a rail or track having periodically-arranged plates $u^2$, provided with hooked ends, of a yoke or hanger moving on said rail or track, a frame secured to the lower end thereof, a bucket secured in said frame, having a hook or detent $s'$, and a spring-pressed bolt $p'$, adapted to be engaged at its lower end by said hook or detent, substantially as set forth.

4. In an elevated carrier, the combination, with a rail or track having periodically-arranged plates $u^2$, provided with hooked ends, of a yoke or hanger moving on said rail or track, a frame secured to the lower end thereof, a bucket secured in said frame, having a pivoted bottom, a hook or detent secured to said bottom, and a spring-pressed bolt $p'$, having a lower hooked end engaged by said hook or detent, substantially as set forth.

5. In an elevated carrier, the combination, with a rail or track having periodically-arranged shoes $e'$ and plates $u^2$, provided with hooked ends, of a yoke or hanger moving on said rail or track, a frame secured to the lower end thereof, a bucket secured in said frame, a hook or detent $s'$, a spring-pressed bolt $p'$, engaged by said hook or detent and the bent or angular arm $c'$ which upon contact with shoe $e'$ will liberate said spring-pressed bolt and permit the same to fly in the path of said hooked end of plate $u^2$, substantially as set forth.

6. In an elevated carrier, the combination, with a bucket and the yoke or frame therefor having stops $i^2$, of the movable frame $f$, provided with upper rails having divergent ends and stops $i'$, the ropes connected to said frame, and the parallel guide-rods, substantially as set forth.

7. In an elevated carrier, the combination, with a rail or track, of a movable frame mounted thereon and having a wheel $g$, a shoe $t^2$ above said wheel, the arm or bar to which said shoe is connected, and the governor secured to said arm or bar, substantially as set forth.

8. In an elevated carrier, the combination, with a rail or track, of a movable frame, a yoke or hanger $b$, a wheel $g$, having its shaft mounted in said yoke or hanger and provided with a bevel gear-wheel $e^2$, a governor having its shaft provided with a bevel-pinion $d^2$, engaging said former pinion, an arm or bar connected at one end to said governor and bearing at its other end in a slot of said yoke or hanger, and a shoe connected thereto and designed to engage said wheel, substantially as set forth.

9. In an elevated carrier, the combination, with a rail or track, of a movable frame, the yoke or hanger having a wheel $g$, the arm $d^2$, secured at one end to said yoke or frame, the wheel $d^3$, carried by said arm, and the arm $d^4$, bearing on said former arm, substantially as set forth.

In testimony whereof I have signed my name to this specification, in the presence of two subscribing witnesses, this 15th day of August, A. D, 1888.

LÉANDRE BOUDREAU.

Witnesses:
  ARTHUR W. CROSSLEY,
  W. C. RAMSAY.